(12) United States Patent
Hornung et al.

(10) Patent No.: US 11,703,470 B2
(45) Date of Patent: Jul. 18, 2023

(54) SENSOR DEVICE FOR DETERMINING HEAT TRANSFER PARAMETERS OF A FLUID

(71) Applicant: Sensirion AG, Stäfa (CH)

(72) Inventors: Mark Hornung, Stäfa (CH); Eric Monnin, Stäfa (CH)

(73) Assignee: Sensirion AG, Stäfa (CH)

( * ) Notice: Subject to any disclaimer, the term of this patent is extended or adjusted under 35 U.S.C. 154(b) by 0 days.

(21) Appl. No.: 17/353,076

(22) Filed: Jun. 21, 2021

(65) Prior Publication Data

US 2021/0396696 A1   Dec. 23, 2021

(30) Foreign Application Priority Data

Jun. 22, 2020   (EP) .................... 20181410

(51) Int. Cl.
  *G01N 25/18*   (2006.01)
  *G01N 25/48*   (2006.01)
(52) U.S. Cl.
  CPC .......... *G01N 25/18* (2013.01); *G01N 25/482* (2013.01); *G01N 25/4826* (2013.01)
(58) Field of Classification Search
  CPC ... G01N 25/18; G01N 25/482; G01N 25/4826
  USPC ......................................................... 374/43
  See application file for complete search history.

(56) References Cited

U.S. PATENT DOCUMENTS

| | | |
|---|---|---|
| 2004/0099057 A1 | 5/2004 | Hornung et al. |
| 2011/0283787 A1 | 11/2011 | Kramer et al. |
| 2020/0068317 A1 | 2/2020 | Hsieh et al. |
| 2020/0124549 A1* | 4/2020 | Hammerschmidt ......... G01N 33/0009 |
| 2020/0249184 A1* | 8/2020 | Matsukura ........... G01N 25/488 |
| 2021/0048401 A1 | 2/2021 | Hornung et al. |

FOREIGN PATENT DOCUMENTS

| | | |
|---|---|---|
| DE | 10 2005 033 867 A1 | 1/2007 |
| EP | 1 426 740 A2 | 6/2004 |
| EP | 3 367 087 A2 | 8/2018 |

(Continued)

OTHER PUBLICATIONS

Translation of JP2019028056A (Year: 2019).*
Extended European Search Report dated Feb. 10, 2021, in European Appl. No. 20181410.0 (8pgs.).

*Primary Examiner* — Mirellys Jagan
(74) *Attorney, Agent, or Firm* — Foley & Lardner LLP

(57) ABSTRACT

A sensor device for determining at least one heat transfer parameter of a gas comprises a sensor unit (10) comprising at least one heater element and at least one temperature sensor. A first (inner) housing (20) receives the sensor unit. The first housing comprises a first membrane (22) allowing a diffusive gas exchange between the exterior and the interior of the first housing. The first housing is received in a second (outer) housing (30). The second housing comprises a second membrane (32) allowing a diffusive gas exchange between the exterior of the second housing and the exterior of the first housing. Thereby temperature gradients inside the first housing are reduced. The second housing can be made of metal and can be disposed on a support plate (40), taking the form of a cap. An auxiliary sensor (50) can be arranged in the space between the first and second housings.

20 Claims, 2 Drawing Sheets

(56) References Cited

FOREIGN PATENT DOCUMENTS

| | | |
|---|---|---|
| EP | 3907491 A1 * 11/2021 | ........... G01N 29/036 |
| JP | 2013-113733 A | 6/2013 |
| JP | 2017-173128 A | 9/2017 |
| JP | 2019-028056 A | 2/2019 |
| WO | WO-2012/117568 A1 | 9/2012 |

\* cited by examiner

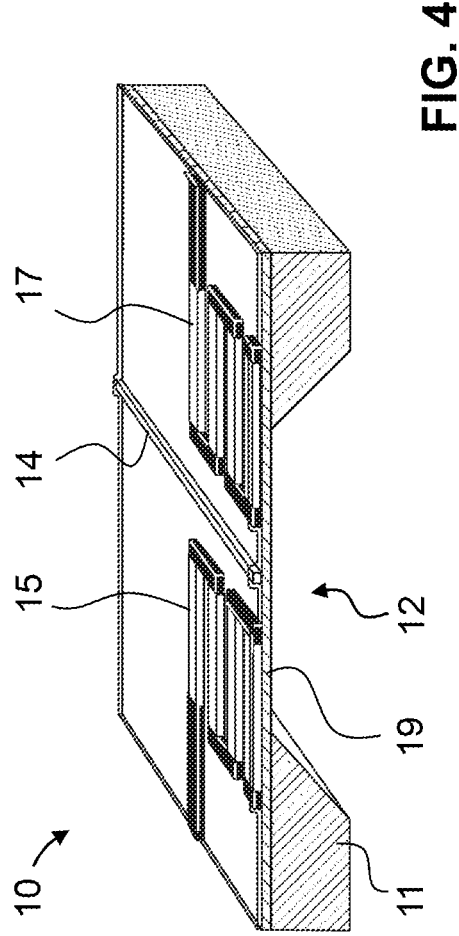

SENSOR DEVICE FOR DETERMINING HEAT TRANSFER PARAMETERS OF A FLUID

CROSS REFERENCE TO RELATED APPLICATIONS

This application claims priority to European Patent Application No. 20181410.0 filed Jun. 22, 2020; the disclosures of which is incorporated by reference herein in its entirety.

TECHNICAL FIELD

The present invention relates to a sensor device for determining one or more heat transfer parameters of a fluid, such as its thermal conductivity, thermal diffusivity, specific heat capacity or related parameters, and to a method of use of such a sensor device.

PRIOR ART

From the prior art, it is known to determine heat transfer parameters of fluids (liquids or gases) using a sensor unit that comprises a heater element and one or more temperature sensors arranged in close proximity to the heater element. The heater element and the temperature sensors are exposed to the fluid. The fluid is heated by the heater element, and the transient and/or steady-state responses of the temperature sensors are recorded. These responses depend on the heat transfer properties of the fluid. On this basis, the desired heat transfer parameters can be determined. A variety of different methods has been proposed for this purpose.

A sensor unit of this type can take the form of a microthermal sensor, which is typically manufactured using photolithographic and etching processes similar to those normally employed in the semiconductor industry for manufacturing integrated circuitry. Electronic signal processing circuitry can be present on the same substrate as the heater element and the temperature sensors. By the way of example, EP 1 426 740 A1 discloses a microthermal sensor that comprises a substrate having an opening or recess spanned by a dielectric carrier layer. The carrier layer carries a heater element and two temperature sensors arranged symmetrically from the heater element. Another microthermal sensor for determining one or more heat transfer parameters of a fluid is disclosed in EP 3 367 087 A2. Instead of a continuous carrier layer, separate bridges span the opening or recess of the substrate, the bridges being separated by voids. At least one of the bridges carries the heater element, and at least one other bridge carries a temperature sensor.

Sensor units of the above type are extremely sensitive to fluid flow over the heater element and temperature sensors. It can therefore be necessary either to compensate for fluid flow or to avoid fluid flow altogether. EP 3 367 087 A2 suggests to surround the sensor unit with a housing in order to avoid fluid flow over the heater element and the temperature sensors. The housing comprises a "venting medium" that allows for diffusive fluid exchange between the interior of the housing and its surroundings while avoiding direct flow over the sensor unit.

Even with such a housing, the sensor unit may still exhibit inaccuracies.

SUMMARY OF THE INVENTION

It is therefore an object of the present invention to provide a sensor device for determining one or more heat transfer parameters of a fluid, the sensor device having improved accuracy.

A sensor device for determining at least one heat transfer parameter of a fluid is disclosed. The sensor device comprises:
- a sensor unit comprising at least one heater element and at least one temperature sensor;
- a first ("inner") housing defining an interior and an exterior, the sensor unit being received in the first housing, the first housing comprising a first membrane, the first membrane allowing a diffusive gas exchange between the exterior and the interior of the first housing; and
- a second ("outer") housing defining an interior and an exterior, the first housing being received in the interior of the second housing, the second housing comprising a second membrane, the second membrane allowing a diffusive gas exchange between the exterior of the second housing and the exterior of the first housing.

The inventors of the present invention have realized that sensor inaccuracies may in particular be due to temperature gradients inside a housing that surrounds the sensor unit. Such temperature gradients can arise if different portions of the housing have different wall temperatures. Different wall temperatures can be the result of, e.g., thermal radiation impinging on the walls of the housing or of fluid flow in the surrounding of the housing. Temperature gradients compromise sensor accuracy because heat transfer parameters like thermal conductivity and specific heat capacity can strongly depend on absolute temperature. This is particularly true if the fluid is a gas. Furthermore, temperature gradients can cause undesired convective flow inside the housing, which in turn can negatively affect sensor accuracy.

The present disclosure provides a sensor device that is less susceptible to inaccuracies due to temperature gradients. To this end, an inner housing comprising a first membrane defines a cavity in its interior that receives the sensor unit. An outer housing comprising a second membrane in turn defines a further cavity that receives the inner housing. The outer housing shields the inner housing from possible causes of temperature gradients inside the inner housing, thereby ensuring a uniform temperature distribution inside the inner housing and avoiding convective flow inside the inner housing. In this way, accuracy and stability of the sensor device are improved.

The sensor device of the present invention has particular advantages if it is intended to be used outdoors. In outdoor use, the sensor device can be exposed to changing environmental impacts like sunshine, wind, rain and snow. For instance, sunshine can cause strong temperature differences between a portion of the sensor device that is exposed to direct sunlight and another portion that is shaded from the sunlight. The present invention mitigates the effects of such temperature differences by providing two housings that are nested within one another, the outer housing shielding the inner housing from direct sunlight. Another possible cause of inaccuracies is wind. The first housing with the first membrane alone can be insufficient to prevent direct air flow from passing through the first membrane, and it can also be insufficient to prevent temperature gradients from being generated in the interior of the first housing as the result of wind. This is particularly true if the air temperature of the wind is different from the temperature of the walls of the first housing, because in this case the wind can cause convective flow inside the first housing due to different portions of the first housing assuming different wall temperatures due to the wind. The latter problem cannot be resolved simply by using a thicker or less permeable first membrane. Only the dual-housing, dual-membrane configuration of the present invention ensures that the sensor unit is effectively shielded from the effects of wind in the environment of the sensor device.

In other applications, the sensor device of the present invention may be intended to be used inside a separate enclosure that is heated in order to avoid condensation of humidity inside the enclosure. Local heating of the interior of the enclosure can again cause strong temperature differences between different parts of the sensor device, whose effects on sensor accuracy are mitigated by the presence of two nested housings.

The second (outer) housing may comprise a base body, which defines one or more openings. The second membrane can then be disposed in or on the one or more openings. Likewise, the first (inner) housing may comprise a base body, which defines one or more openings, and the first membrane can be disposed in or on the one or more openings. The second (outer) housing is preferably spaced from the first (inner) housing, allowing the fluid of interest to enter a space between the first and second housings. In particular, the second membrane is preferably spaced from the first membrane.

Temperature gradients inside the first (inner) housing can be reduced in a particularly efficient manner if the base body of the second (outer) housing comprises a thermally conductive material that has a thermal conductivity of at least 10 W/mK at 20° C., in particular, a metal. Using a thermally conductive material for the base body of the second housing increases the uniformity of the temperature distribution inside the second housing and thereby reduces temperature gradients also in the first housing.

In particular, in some embodiments, the entire base body of the second housing may essentially consist of the thermally conductive material, in particular, of a metal. Examples of suitable metals for manufacturing the base body include stainless steel, bronze, aluminum, copper, silver, and gold. In other embodiments, the base body of the second housing may comprise two or more material layers, at least one of the material layers being a thermally conductive layer made of the thermally conductive material. Examples of suitable metals for manufacturing the thermally conductive layer include aluminum, copper, silver, and gold. Suitable non-metals include silicon, graphite, aluminum oxide, aluminum nitride and silicon nitride.

It is advantageous to keep the openings in the base body of the second housing, which are covered by the second membrane, comparatively small. In particular, it is advantageous if the one or more openings have a total area (measured in a plane defined by the wall region that surrounds each opening) that is not more than 20% of the total outer surface area of the base body. In this manner, efficient equalization of temperature differences between different portions of the base body can be achieved by thermal conduction in the base body, despite the presence of the openings.

In advantageous embodiments, the sensor device comprises a support plate, and both the first housing and the second housing are mounted on the support plate. The second housing, in particular, its base body, preferably takes the form of a cap that is open towards the support plate, defining a circumferential rim, and that is attached to the support plate along its circumferential rim, preferably in a fluid-tight manner. As a result, the second housing and the support plate together delimit the interior of the second housing. In particular, the base body of the second housing may have a circumferential side wall and a top wall, the circumferential side wall forming the circumferential rim and being connected to the support plate along the circumferential rim, and the top wall covering the interior of the second housing at a distance from the support plate. The top wall can be flat or domed. The openings of the second housing can advantageously be formed in the top wall.

The support plate can in particular be a printed circuit board. Further electronic components can be arranged on the printed circuit board in addition to the sensor device.

The support plate generally has two opposite sides, one of these sides defining a mounting surface on which the first and second housings are disposed. In order to further reduce temperature gradients inside the second housing, the support plate may comprise at least one thermally conductive layer made of a material that has a thermal conductivity of at least 10 W/mK at 20° C., in particular, a metal layer, at least part of the thermally conductive layer overlapping with a portion of the mounting surface that faces the interior of the second housing. Preferably the thermally conductive layer overlaps with a large proportion of the surface area of that portion of the mounting surface that faces the interior of the second (outer) housing. In particular, the mounting surface may have a portion that faces the interior of the second housing while not being covered by any components (such as the first housing or an auxiliary sensor) inside the second housing. In this case it is preferred that the thermally conductive layer extends over at least 80% of said portion of the mounting surface.

The second (outer) housing is preferably connected to the thermally conductive layer in a thermally conductive manner. A thermally conductive connection can be achieved, in particular, by soldering, by directly pressing the second housing onto the thermally conductive layer or onto a thermally conductive material disposed on the thermally conductive layer, or by adhesive bonding using an adhesive layer, which is preferably sufficiently thin not to impede thermal conduction. Thereby efficient temperature equalization can be achieved between the second housing and the support plate.

The device can further comprise an auxiliary sensor, in particular, a humidity sensor and/or a temperature sensor. The auxiliary sensor can then advantageously be disposed in the space between the first (inner) and second (outer) housings, i.e., it can be disposed in the interior of the second (outer) housing while being disposed outside the first (inner) housing. In particular, the auxiliary sensor can be mounted on the support plate in the interior of the second housing. In this manner the auxiliary sensor is exposed to similar conditions as the sensor unit in the first housing. In particular, the auxiliary sensor is exposed to reduced temperature gradients due to the presence of the second (outer) housing and is protected from harmful environmental impacts like direct sunlight, wind, rain and snow, which might compromise accuracy of the readings of the auxiliary sensor.

The sensor unit in the first (inner) housing may in particular be a microthermal sensor unit. It may comprise a substrate having an opening or recess, the heater element and the at least one temperature sensor being arranged on dielectric bridges or on a continuous dielectric carrier layer spanning the opening or recess. The substrate may be a semiconductor substrate. The sensor unit may further comprise analog and/or digital circuitry disposed on or in the semiconductor substrate for operating the heater element and processing the responses of the one or more temperature sensors, as it is well known in the art.

The first housing may be specifically configured to house the microthermal sensor unit. In particular, the first housing may comprise a base body made of a plastic material (a polymeric material, e.g., a mold compound), and the substrate of the sensor unit may be at least partially embedded in the plastic material.

The sensor device of the present invention may be used in a variety of different applications. Due to its high accuracy, sensitivity and robustness, the sensor device of the present invention is particularly useful for detecting gas leaks, in particular, refrigerant leaks in an HVAC system or in a refrigerator. Accordingly, the present disclosure also provides a method for detecting gas leaks, in particular, refrigerant leaks in an HVAC system or in a refrigerator, using the sensor device. In this method, the sensor device is exposed to air in the vicinity of a potential leak. The method comprises:

- providing heater power to the heater element to heat the heater element;
- measuring a response of the at least one temperature sensor;
- determining at least one heat transfer parameter based on the response of the at least one temperature sensor; and
- calculating a leakage indicator based on the at least one heat transfer parameter.

The method can further comprise outputting the leakage indicator, e.g., using a visual or acoustic output device, and/or transmitting the leakage indicator to a surveillance device.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

FIG. 4 shows, in a schematic perspective sectional view, the microthermal sensor of a sensor device according to a second embodiment.

DESCRIPTION OF PREFERRED EMBODIMENTS

Definitions

Figure 1:
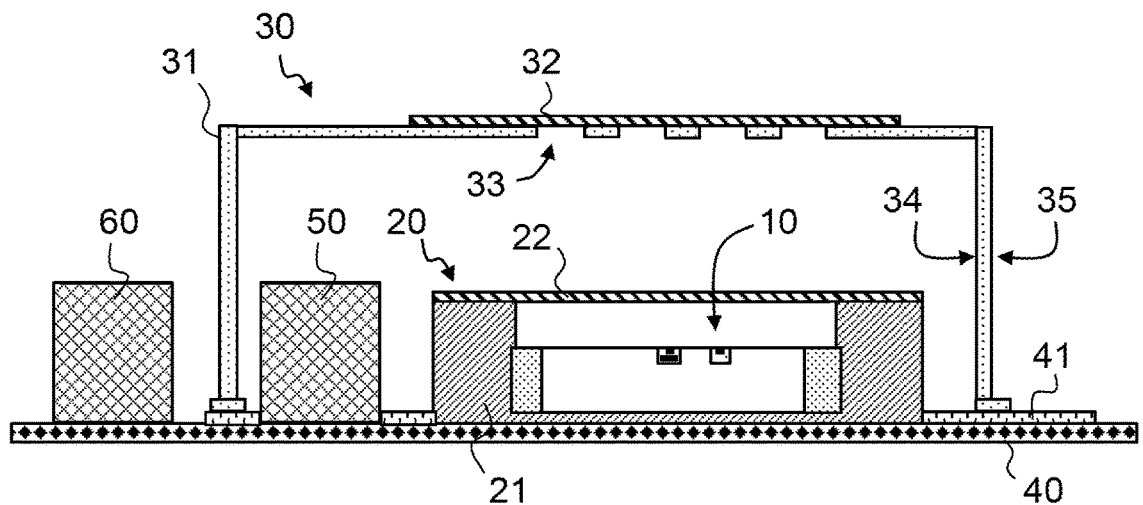
FIG. 1 shows, in a schematic sectional view, a sensor device according to a first embodiment.

In the present disclosure, references in the singular may also include the plural. Specifically, the word "a" or "an" may refer to one, or one or more, unless the context indicates otherwise.

An object is to be understood to "essentially consist of" a material if the material is present in such a proportion that the material imparts its essential characteristics to the object. For instance, in the context of the present disclosure, an object is to be understood to "essentially consist of a metal" if the metal is present in such a proportion that the object exhibits a thermal conductivity that to a good approximation corresponds to the thermal conductivity of the metal. The expression "essentially consisting of" does not exclude the presence of limited amounts of other materials. For instance, the expression "an object essentially consisting of a metal" does not exclude that the object comprises a passivation layer like an oxide layer or a protective coating.

A material is considered to be "thermally conductive" if it has a thermal conductivity of at least 10 W/mK at 20° C. Thermally conductive materials include most metals, but also some non-metals, notably silicon, graphite, aluminum oxide, aluminum nitride and silicon nitride.

The term "metal" includes both metals in elementary form and alloys.

The term "fluid" is to be understood to encompass both liquids and gases, in particular, air.

The term "membrane" is to be understood to refer to a structure that is permeable to a fluid of interest while being impermeable to other materials, in particular, to particulate matter. If the fluid of interest is a gas, the membrane may be permeable to the gas while being impermeable to dust, and it may repel liquid droplets. The membrane may block any directed flow of fluid, and fluid exchange through the membrane may occur only by diffusion. Many different types of membranes that are suitable in the context of the present disclosure are known, and the present disclosure is not limited to any particular kind of membrane. A membrane can comprise organic materials like porous polymers and/or inorganic materials like glass fibers. A membrane does not necessarily have to be thin. For instance, an open-pore foam can form a membrane even at considerable thickness. In the prior art relating to microthermal sensors, sometimes a dielectric carrier layer that spans an opening or recess is also called a "membrane". In order to avoid confusion, this use of the term "membrane" is avoided in the present disclosure.

A "microthermal sensor" is a miniaturized sensor unit that comprises at least one heater element and at least one temperature sensor. Preferably the microthermal sensor has at least one characteristic dimension on the sub-millimeter scale, the characteristic dimension determining a length over which heat transfer through a fluid is determined with the microthermal sensor. In particular, the distance between a heater element and at least one temperature sensor of the microthermal sensor will typically be less than 1 mm. Microthermal sensors are usually fabricated by processes that are normally employed in the semiconductor industry, i.e., they are manufactured by applying and patterning a plurality of layers on a semiconductor substrate, using photolithographic and etching methods. A typical process is the well-known CMOS process. A microthermal sensor can include, on the same substrate as the heater element and the temperature sensors, electronic circuitry for operating the heater element and for processing signals from the temperature sensors.

A "heat transfer parameter" is a parameter that is indicative of at least one heat transfer property of a material. In particular, the heat transfer parameter can be thermal conductivity, thermal diffusivity, specific heat capacity, or a related parameter that depends on one or more of the aforementioned parameters.

First Embodiment

Figure 2:
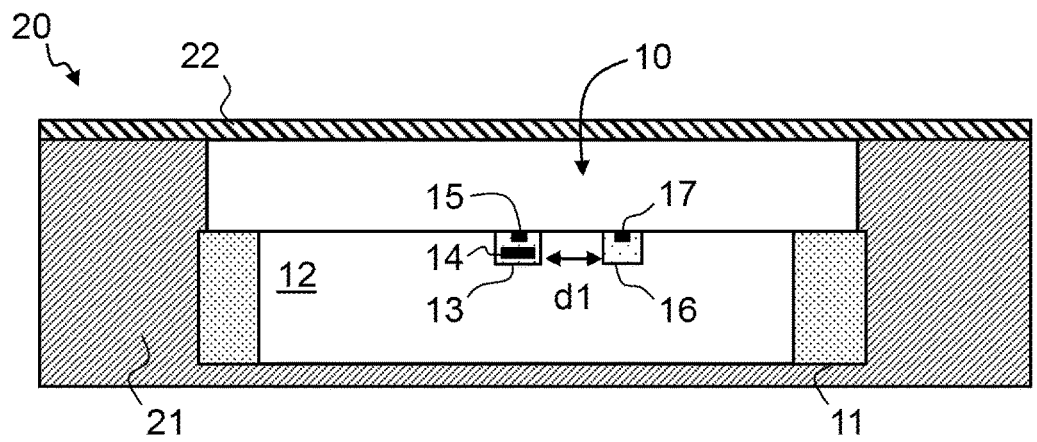
FIG. 2 shows, in an enlarged schematic sectional view, the microthermal sensor of the sensor device in FIG. 1, together with the inner housing.
Figure 3:
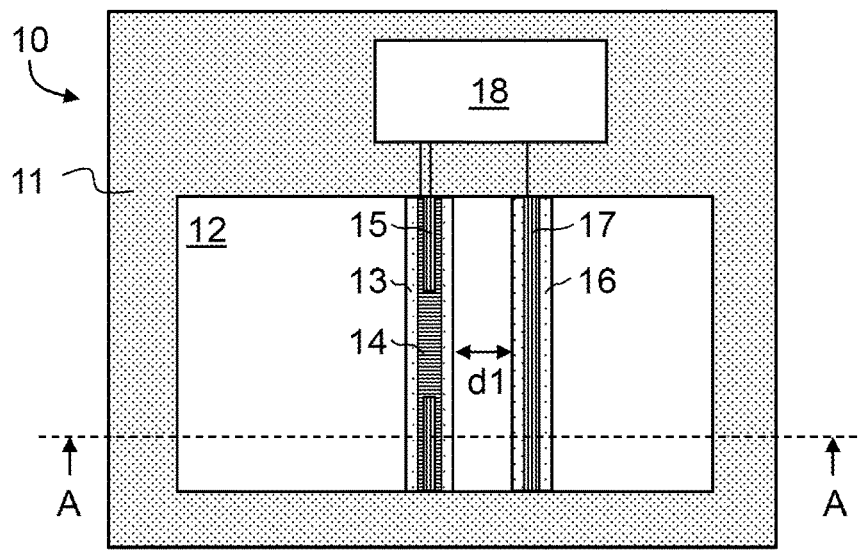
FIG. 3 shows, in an enlarged schematic top view, the microthermal sensor in FIG. 1.

FIGS. 1 to 3 illustrate a sensor device according to a first embodiment of the present invention. The sensor device is shown in a highly schematic manner, and it should be understood that the drawings are not to scale. In order to better illustrate the setup of the sensor device, bridges are illustrated in FIG. 3 in a manner as if they were partially transparent. The sectional plane for the sectional views of FIGS. 1 and 2 is indicated as plane A-A in FIG. 3.

The sensor device comprises a sensor unit 10 in the form of a microthermal sensor. The sensor unit 10 comprises a silicon substrate 11 having an opening 12. Two bridges 13, 16 span the opening. Each bridge may be formed by a plurality of dielectric layers, metal layers and/or poly-silicon layers. The dielectric layers may in particular comprise layers of silicon oxide and/or silicon nitride. The bridges have an edge-to-edge distance dl. The first bridge 13 comprises a heater element 14 and a first temperature sensor 15, which is adapted to measure the temperature of the first bridge 13. The heater element 14 and the temperature sensor 15 are electrically insulated from each other by one or more dielectric layers. The second bridge 16 comprises a second temperature sensor 17, which is adapted to measure the temperature of the second bridge 16. The temperature sensors can be, e.g., resistive elements. The sensor unit 10 further comprises integrated electronic circuitry 18 for operating the heater element 14 and processing the responses of the temperature sensors 15, 17. The electronic circuitry is formed on the same substrate 11 as the bridges 13, 16. For further details, reference is made to EP 3 367 087 A2.

The sensor unit 10 is received in a first ("inner") housing 20. The first housing 20 comprises a base body 21 made of a mold compound. The substrate 11 is partially embedded in the mold compound. The base body 21 has a top opening, which is covered by a first membrane 22. The first membrane 22 allows a diffusive gas exchange between the exterior and the interior of the first housing 21 while avoiding the entry of any directed gas flow into the interior of the first housing 21.

The first housing 20 is mounted on a support plate 40 in the form of a printed circuit board (PCB). Directions are referred to as follows: The side of the support plate 40 on which the first housing 20 is mounted is called the top side, and the corresponding surface of the support plate is called the mounting surface. The other side is called the bottom side.

For connecting the sensor unit 10 inside the first housing 20 to the PCB, a plurality of contacts may be formed on the bottom and/or side walls of the first housing 20, the contacts connecting to the circuitry 18 of the sensor unit 10, and the first housing may be connected to the PCB by soldering the contacts to corresponding conductor traces on the PCB.

Also mounted on the support plate 40 is a second ("outer") housing 30. The second housing comprises a base body 31. The base body 31 has the form of a cap that is open towards the bottom. The cap has a circumferential side wall that forms a circumferential rim at its bottom, and it has a flat horizontal top wall that is arranged at a distance from the support plate 40. The base body 31 is connected to the support plate 40 along the circumferential rim. In the top wall, the base body 31 has a plurality of openings 33. The openings 33 are covered by a second membrane 32, which allows a diffusive gas exchange between the exterior of the second housing 30 and its interior while avoiding any directed flow to pass through the openings 33. The base body 31, the second membrane 32, and the support plate 40 together delimit the interior of the second housing 30.

Outside the first housing 20, but still inside the second housing 30, a first auxiliary sensor 50 in the form of a combined relative humidity and temperature sensor (RH/T sensor) is mounted on the support plate 40. A determination of the heat transfer parameters may take the relative humidity and temperature determined by the first auxiliary sensor 50 into account. By arranging the first auxiliary sensor 50 inside the second housing 30, it is ensured that the determination of relative humidity and temperature takes place under well-defined conditions, which essentially correspond to the conditions to which also the sensor unit 10 is exposed. Thereby accuracy is further improved.

A second auxiliary sensor 60 is mounted on the support plate 40 outside the second housing 30. In the present example, the second auxiliary sensor 60 is a pressure sensor for determining the absolute pressure of the gas that surrounds the second housing 30. The determination of the heat transfer parameters may take the absolute pressure determined by the second auxiliary sensor 60 into account.

The base body 31 of the second housing 30 is made of a metal. It is therefore thermally conductive. In this manner it is ensured that temperature differences between different portions of the base body 31 are equalized by thermal conduction in the material of the base body. In order to ensure good thermal conduction throughout the base body, each of the openings 33 is comparatively small, and their total area is small compared to the total outer surface area of the base body 31.

In order to further improve temperature equalization inside the second housing 30, the support plate 40 comprises a metal layer 41. This metal layer 41 extends over a large proportion of the "free" portion of the mounting surface inside the second housing 30, i.e., of that portion of the mounting surface that is arranged inside the second housing 30 and that is not covered by any other components, like the first housing 20 or the first auxiliary sensor 50. The metal layer 41 can be, for instance, a layer formed by solder disposed on the PCB that forms the support plate 40. In other embodiments, the metal layer 41 can be an integral part of the PCB, e.g., an integral conductor layer of the PCB.

Along its bottom rim, the base body 31 of the second housing is connected to the metal layer 41 in a thermally conductive and gas-tight manner, e.g., by soldering the base body 31 to the metal layer 41.

Second Embodiment

In a second embodiment, the heater element 14 and the temperature sensors 15, 17 of the sensor unit 10 are disposed on a common dielectric carrier layer 19 that spans the opening 12 of the substrate 11, as illustrated in FIG. 4, instead of being formed on separate bridges, as in FIGS. 1-3. In the present example, each of the temperature sensors 15, 17 is a thermopile. For further details, reference is made to EP 1 426 740 A2.

Operation of the Sensor Device of the First or Second Embodiment

For determining heat transfer parameters of a fluid in contact with the sensor unit 10, the sensor device is operated as follows: The heater 14 is supplied with heater power. While the heater is activated, the temperature sensors 15, 17 are read out. From the stationary-state response of the temperature sensors 15, 17 and/or their transient response, one or more heat transfer parameters are determined, using methods that are well known in the art per se. Examples are given, e.g., in EP 3 367 087 A2 and EP 1 426 740 A2.

The sensor device can be used in a variety of different applications. One important application is the use for detecting gas leaks, in particular, refrigerant leaks in an HVAC system or in a refrigerator, based on changes of heat transfer parameters of the air due to the presence of the leaked gas. In such applications, a leakage indicator can be calculated based on the measured heat transfer parameter(s). For instance, the leakage indicator can be a Boolean variable whose value "1" indicates the presence of at least a threshold amount of leaked gas in the air while the value "0" indicates its absence, or the leakage indicator can be an integer or floating-point variable whose value indicates the concentration of the leaked gas. The presently proposed sensor device is particularly well-suited for such applications due to its high accuracy, sensitivity and robustness.

However, applications are not limited to leakage detection. For instance, the sensor device can be employed for determining the composition of a mixture of known gases having different thermal properties, e.g., the mixing ratio of two gases. As another example, the sensor device may be employed for determining a combustion-related parameter of a combustible gas, such as its calorific value, Wobbe index or methane number, using known correlations between heat-transfer parameters and the desired combustion-related parameter.

Modifications

Many modifications of the above-described sensor device are possible. For instance, instead of producing the second housing from metal, the second housing can be produced from a multi-layer composite material comprising at least one thermally conductive layer, e.g., from a metal-coated polymer material.

Instead of providing the first and second membranes in the form of continuous sheets, as in FIG. 1, these membranes may also take other forms. For instance, the second membrane may take the form of a plurality of gas-permeable plugs disposed in the openings of the base body 31.

Many other modifications are possible.

The invention claimed is:

1. A sensor device for determining at least one heat transfer parameter of a fluid of interest, the fluid of interest being a gas, the sensor device comprising:
   a support plate having a mounting surface;
   a sensor unit comprising at least one heater element and at least one temperature sensor;
   a first housing defining an interior and an exterior, the first housing being mounted on the mounting surface of the support plate, the sensor unit being received in the first housing, the first housing comprising a first membrane, the first membrane allowing diffusive gas exchange of the fluid of interest between the exterior and the interior of the first housing; and
   a second housing defining an interior and an exterior, the second housing being mounted on the mounting surface of the support plate, the second housing having the form of a cap that is open towards the support plate, the cap defining a circumferential rim that is connected to the support plate, the first housing being received in the interior of the second housing, the second housing comprising a second membrane, the second membrane allowing diffusive gas exchange of the fluid of interest between the exterior of the second housing and the exterior of the first housing,
   wherein the second housing comprises a base body, the second membrane being disposed in or on one or more openings of the base body, and
   wherein the base body of the second housing comprises or essentially consists of a thermally conductive material having a thermal conductivity of at least 10 W/mK at 20° C.,
   wherein the support plate comprises a thermally conductive layer made of a thermally conductive material having a thermal conductivity of at least 10 W/mK at 20° C., at least part of the thermally conductive layer overlapping with a portion of the mounting surface that faces the interior of the second housing, and
   wherein the second housing is connected to the thermally conductive layer of the support plate in a thermally conductive manner.

2. The sensor device of claim 1, wherein the base body of the second housing comprises or essentially consists of a metal.

3. The sensor device of claim 1, wherein the thermally conductive layer of the support plate is a metal layer.

4. The sensor device of claim 1,
   wherein the mounting surface has a portion that faces the interior of the second housing while not being covered by any components inside the second housing, and
   wherein the thermally conductive layer overlaps with at least 80% of said portion of the mounting surface.

5. A sensor device for determining at least one heat transfer parameter of a fluid of interest, the fluid of interest being a gas, the sensor device comprising:
   a sensor unit comprising at least one heater element and at least one temperature sensor;
   a first housing defining an interior and an exterior, the sensor unit being received in the first housing, the first housing comprising a first membrane, the first membrane allowing diffusive gas exchange of the fluid of interest between the exterior and the interior of the first housing; and
   a second housing defining an interior and an exterior, the first housing being received in the interior of the second housing, the second housing comprising a second membrane, the second membrane allowing diffusive gas exchange of the fluid of interest between the exterior of the second housing and the exterior of the first housing,
   wherein the second housing comprises a base body, the second membrane being disposed in or on one or more openings of the base body, and
   wherein the base body of the second housing comprises two or more material layers, at least one of the material layers being a thermally conductive layer made of a thermally conductive material having a thermal conductivity of at least 10 W/mK at 20° C.

6. The sensor device of claim 5, wherein the thermally conductive layer is a metal layer.

7. The sensor device of claim 5, further comprising a support plate,
   both the first housing and the second housing being mounted on the support plate,
   the second housing having the form of a cap that is open towards the support plate, the cap defining a circumferential rim that is connected to the support plate.

8. The sensor device of claim 7, wherein the support plate is a printed circuit board.

9. The sensor device of claim 7,
   wherein the support plate has a mounting surface on which the first and second housings are disposed,
   wherein the support plate comprises a thermally conductive layer made of a thermally conductive material having a thermal conductivity of at least 10 W/mK at 20° C., at least part of the thermally conductive layer overlapping with a portion of the mounting surface that faces the interior of the second housing, and
   wherein the second housing is connected to the thermally conductive layer of the support plate in a thermally conductive manner.

10. A sensor device for determining at least one heat transfer parameter of a fluid of interest, the fluid of interest being a gas, the sensor device comprising:
    a sensor unit comprising at least one heater element and at least one temperature sensor;
    a first housing defining an interior and an exterior, the sensor unit being received in the first housing, the first housing comprising a first membrane, the first membrane allowing diffusive gas exchange of the fluid of interest between the exterior and the interior of the first housing; and a second housing defining an interior and an exterior, the first housing being received in the interior of the second housing, the second housing comprising a second membrane, the second membrane allowing diffusive gas exchange of the fluid of interest between the exterior of the second housing and the exterior of the first housing, wherein the second housing comprises a base body, the second membrane being disposed in or on one or more openings of the base body, wherein the base body of the second housing comprises or essentially consists of a thermally conductive material having a thermal conductivity of at least 10 W/mK at 20° C., and wherein the sensor device further comprises an auxiliary sensor, the auxiliary sensor being disposed in the interior of the second housing while being disposed outside the first housing.

11. The sensor device of claim 10, wherein the auxiliary sensor is a humidity sensor and/or a temperature sensor.

12. The sensor device of claim 10, further comprising a support plate, both the first housing and the second housing being mounted on the support plate, the second housing having the form of a cap that is open towards the support plate, the cap defining a circumferential rim that is connected to the support plate, wherein the auxiliary sensor is mounted on the support plate in the interior of the second housing.

13. A sensor device for determining at least one heat transfer parameter of a fluid of interest, the fluid of interest being a gas, the sensor device comprising:

a sensor unit comprising a substrate having an opening or recess, at least one heater element, and at least one temperature sensor, wherein the at least one heater element and the at least one temperature sensor are arranged on dielectric bridges spanning the opening or recess or on a continuous dielectric carrier layer spanning the opening or recess, a first housing defining an interior and an exterior, the sensor unit being received in the first housing, the first housing comprising a first membrane, the first membrane allowing diffusive gas exchange of the fluid of interest between the exterior and the interior of the first housing; and a second housing defining an interior and an exterior, the first housing being received in the interior of the second housing, the second housing comprising a second membrane, the second membrane allowing diffusive gas exchange of the fluid of interest between the exterior of the second housing and the exterior of the first housing, wherein the second housing comprises a base body, the second membrane being disposed in or on one or more openings of the base body, and wherein the base body of the second housing comprises or essentially consists of a thermally conductive material having a thermal conductivity of at least 10 W/mK at 20° C.

14. The sensor device of claim 13, wherein the substrate is a semiconductor substrate, and wherein the sensor unit further comprises electronic circuitry disposed on or in the semiconductor substrate for operating the heater element and processing a response of the at least one temperature sensor.

15. The sensor device of claim 13, wherein the first housing comprises a base body made of a plastic material, the first membrane being arranged in or on at least one opening of the base body of the first housing, and wherein the substrate of the sensor unit is at least partially embedded in the plastic material.

16. The sensor device of claim 13, wherein the base body of the second housing comprises or essentially consists of a metal.

17. The sensor device of claim 13, further comprising a support plate, both the first housing and the second housing being mounted on the support plate, the second housing having the form of a cap that is open towards the support plate, the cap defining a circumferential rim that is connected to the support plate.

18. The sensor device of claim 17, wherein the support plate has a mounting surface on which the first and second housings are disposed, wherein the support plate comprises a thermally conductive layer made of a thermally conductive material having a thermal conductivity of at least 10 W/mK at 20° C., at least part of the thermally conductive layer overlapping with a portion of the mounting surface that faces the interior ov the second housing, and wherein the second housing is connected to the thermally conductive layer of the support plate in a thermally conductive manner.

19. A method for detecting a gas leak, the method comprising:

exposing the sensor device of claim 13 to air;

providing heater power to the at least one heater element to heat the at least one heater element;

measuring a response of the at least one temperature sensor;

determining at least one heat transfer parameter of the air based on the response of the at least one temperature sensor; and calculating a leakage indicator based on the at least one heat transfer parameter.

20. The method of claim 19, further comprising:

outputting the leakage indicator and/or transmitting the leakage indicator to a monitoring device.

* * * * *